United States Patent
Garg et al.

(10) Patent No.: US 12,066,940 B2
(45) Date of Patent: Aug. 20, 2024

(54) DATA REUSE CACHE

(71) Applicant: Advanced Micro Devices, Inc., Santa Clara, CA (US)

(72) Inventors: Alok Garg, Maynard, MA (US); Neil N Marketkar, Jamaica Plain, MA (US); Matthew T. Sobel, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 61 days.

(21) Appl. No.: 17/955,618

(22) Filed: Sep. 29, 2022

(65) Prior Publication Data

US 2024/0111674 A1    Apr. 4, 2024

(51) Int. Cl.
*G06F 12/00* (2006.01)
*G06F 12/0811* (2016.01)
*G06F 12/0875* (2016.01)
*G06F 12/0884* (2016.01)

(52) U.S. Cl.
CPC ...... *G06F 12/0811* (2013.01); *G06F 12/0875* (2013.01); *G06F 12/0884* (2013.01)

(58) Field of Classification Search
CPC ............. G06F 12/0811; G06F 12/0875; G06F 12/0884
USPC ......................................................... 711/122
See application file for complete search history.

(56) References Cited

U.S. PATENT DOCUMENTS

| | | | |
|---|---|---|---|
| 6,418,513 B1 * | 7/2002 | Arimilli | G06F 12/0897 |
| | | | 711/E12.043 |
| 2016/0259689 A1 | 9/2016 | Mukherjee et al. | |
| 2017/0010967 A1 | 1/2017 | Venkatasubramanian et al. | |
| 2019/0303303 A1 | 10/2019 | Krishnan et al. | |
| 2019/0384601 A1 | 12/2019 | Hasenplaugh et al. | |

FOREIGN PATENT DOCUMENTS

| | | | | |
|---|---|---|---|---|
| CN | 110168510 A | * | 8/2019 | ........... B62D 7/1527 |
| CN | 112749120 A | | 5/2021 | |
| GB | 2421821 A | * | 7/2006 | ......... G06F 12/1036 |
| WO | 2024073228 A1 | | 4/2024 | |

OTHER PUBLICATIONS

PCT/US2023/073766, "International Seach Report and Written Opinion", PCT Application No. PCT/US2023/073766, Dec. 26, 2023, 6 pages.
Garg, A., et al., "Slackened Memory Dependence Enforcement: Combining Opportunistic Forwarding with Decoupled Verification", 33rd International Symposium on Computer Architecture [retrieved Jul. 6, 2022]. Retrieved from the Internet <https://web.archive.org/web/20160430035640id_/http://www.ece.rochester.edu:80/~mihuang/PAPERS/isca06.pdf>., Jun. 2006, 12 Pages.

* cited by examiner

*Primary Examiner* — Mardochee Chery
(74) *Attorney, Agent, or Firm* — FIG. 1 Patents

(57) ABSTRACT

Data reuse cache techniques are described. In one example, a load instruction is generated by an execution unit of a processor unit. In response to the load instruction, data is loaded by a load-store unit for processing by the execution unit and is also stored to a data reuse cache communicatively coupled between the load-store unit and the execution unit. Upon receipt of a subsequent load instruction for the data from the execution unit, the data is loaded from the data reuse cache for processing by the execution unit.

20 Claims, 5 Drawing Sheets

DATA REUSE CACHE

BACKGROUND

Processor units, such as central processing units, parallel processors, graphics processing units, and so forth are tasked with processing ever-increasing amounts of data. Access to this data is a significant factor in speed, at which, the processor unit is able to process the data. To address this, cache systems are employed to speed this access. Conventional techniques used to implement cache systems, however, are confronted with a variety of challenges including latency, throughput, tradeoffs between size and speed, and so forth. These challenges have hindered operation of the processor units in conventional real-world scenarios, the effect of which is compounded by the ever-increasing amounts of data.

BRIEF DESCRIPTION OF THE DRAWINGS

The detailed description is described with reference to the accompanying figures.

DETAILED DESCRIPTION

Overview

Figure 1:
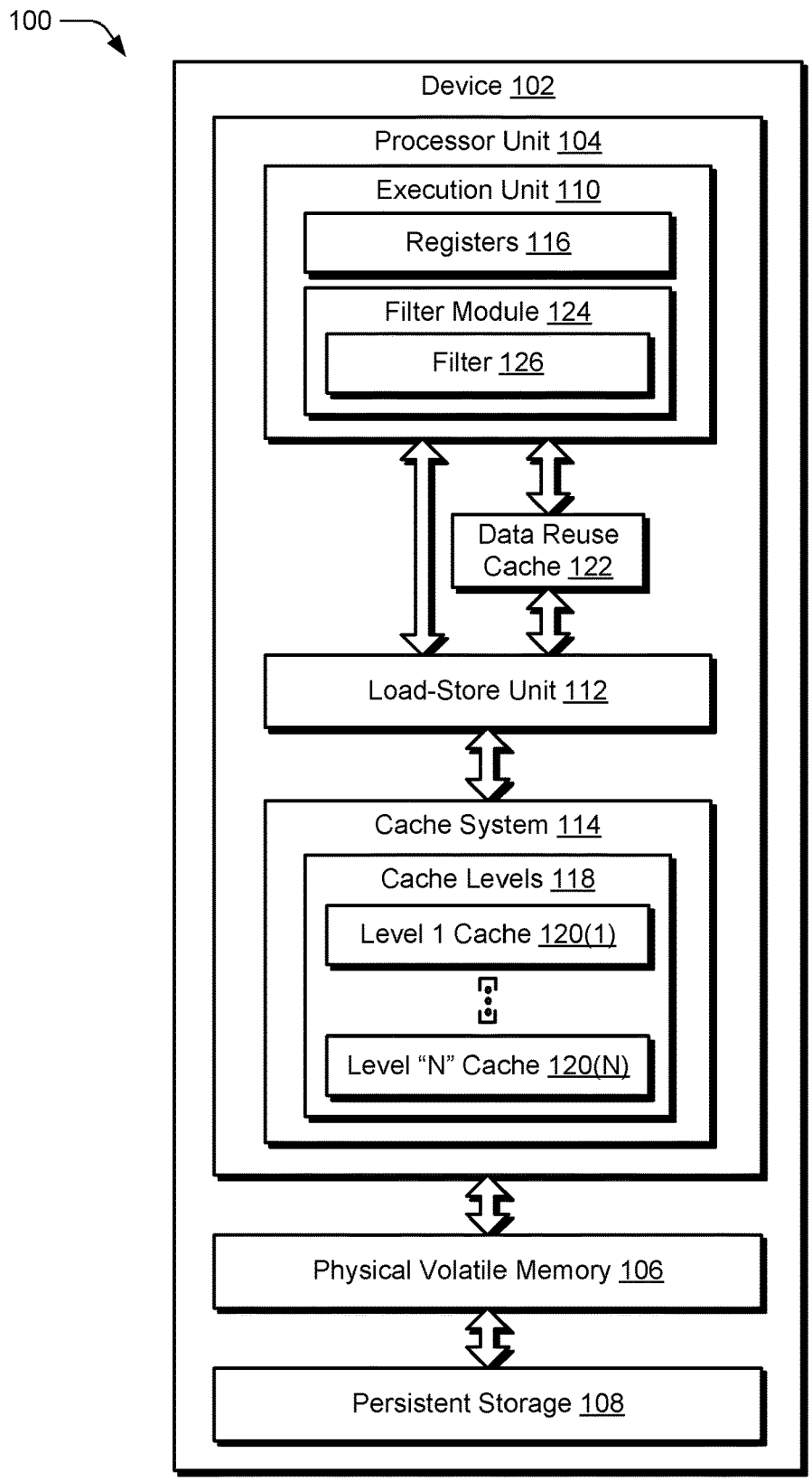
FIG. 1 is a block diagram of a non-limiting example system configured to employ data reuse cache techniques.

Efficiency of data access by processor units has a significant effect on the speed and operation of the processor units as a whole. Efficiencies gained in providing this access function to improve speed of operation of the processor units, reduce power consumption, conserve bandwidth, and support a variety of other technical advantages in utilization of the processor units and devices that employ the processor units.

Accordingly, data reuse cache techniques, systems, and devices are described that further increase technical advantages gained through use of a cache by a processor unit. In an example, a processor unit is implemented in hardware, e.g., as a central processing unit, graphics processing unit, parallel processor, and so forth. The processor unit is configurable to include a plurality of cores, which include cache levels to store data within the core, cache levels that are shared between cores, and so forth.

A core, for instance, includes an execution unit, a load-store unit, and one or more cache levels. The execution unit is configured to issue instructions to process data using corresponding operations. The load-store unit is configured to load data to be processed by the execution unit and store data back to memory. The cache levels are configured to balance size and speed through successively larger levels to improve data access efficiency. Configuration of the cache levels leverages a variety of locality factors. Spatial locality is used to improve operation in situations in which data is requested that is stored physically close to data that is a subject of a previous request. Temporal locality is used to address scenarios in which data that has already been requested will be requested again.

In cache operations, a "hit" occurs to a cache level when desired data that is subject of a load operation is available via the cache level, and a "miss" occurs when the desired data is not available via the cache level. When employing multiple cache levels, requests proceed through successive cache levels until the data is located. Because of this, however, frequent cache misses have an adverse effect that reduces and even eliminates performance gains supported by inclusion of the cache level as part of the processor unit.

To solve these problems, a data reuse cache is implemented as part of a processor unit between the execution unit and a load-store unit. The data reuse cache, for instance, is physically located closer to the execution unit than the load-store unit or cache system, e.g., having a level 1 cache, level 2 cache, and so forth. In an example, the data reuse cache is implemented, solely, for data reuse for load responses including data fetched by the load-store unit. Additionally, the data reuse cache is configured in one example for access in parallel with the cache system, e.g., a level 1 data cache.

The data reuse cache, for instance, is loaded based on load responses from the load-store unit. In real-world scenarios, data loaded in response to a load instruction is often reused in quick succession by itself or by other instructions before being left dormant. This keeps the data closer to the execution unit for faster reuse and reduces computational costs of reloading the data. In practice, four cycles that are typically used to access data from a level 1 cache are reduced to two cycles to access data from the data reuse cache, thereby improving processor unit and device operation as a whole.

Additionally, as described above cache misses introduce additional latency causing a reduction in advantages gained through inclusion of the cache. Configuration of the data reuse cache to have a small size to improve speed, for instance, introduces challenges by potentially increasing miss rate. To solve these problems, filter techniques are employable (e.g., by the execution unit) to filter instructions based on likelihood of an instruction resulting in a hit or miss to the data reuse cache. In this way, the filter is used to filter out load instructions that consistently miss the data reuse cache such that these load instructions are passed directly to the cache levels through the load-store unit without encountering a performance penalty caused by inclusion of the data reuse cache. A variety of other instances are also contemplated, examples of which are described in the following discussion and shown using corresponding figures.

In some aspects, the techniques described herein relate to a method including generating a load instruction at an execution unit, in response to the load instruction: loading data from a load response obtained from a load-store unit for processing by the execution unit, and storing the data from the load response to a data reuse cache communicatively coupled between the load-store unit and the execution unit, generating a subsequent load instruction for the data at the execution unit, and loading the data from the data reuse cache for processing by the execution unit in response to the subsequent load instruction.

In some aspects, the techniques described herein relate to a method, wherein the loading the data includes loading the data from a level of a cache system by the load-store unit.

In some aspects, the techniques described herein relate to a method, wherein the loading the data from the load response is performed in four cycles from the level of the cache system and the loading the data from the data reuse cache is performed in two cycles.

In some aspects, the techniques described herein relate to a method, further including generating a subsequent load instruction and routing the subsequent load instruction for servicing by the load-store unit based on detecting the subsequent load instruction spans more than one cache line of the data reuse cache.

In some aspects, the techniques described herein relate to a method, further including generating a subsequent load instruction and triggering a resynchronization operation based on detecting data that is a subject of the subsequent load instruction is stale.

In some aspects, the techniques described herein relate to a method, further including self-broadcasting a data reuse cache response that includes the data, the self-broadcasting using a broadcast port of the load-store unit.

In some aspects, the techniques described herein relate to a method, further including controlling whether to permit or restrict access, by the subsequent load instruction, to the data reuse cache using a filter.

In some aspects, the techniques described herein relate to a method, wherein the filter indicates a likelihood that the subsequent load instruction is a hit or miss to the data reuse cache.

In some aspects, the techniques described herein relate to a method, wherein the subsequent load instruction is included in a plurality of load instructions and the filter maintains a plurality of hit counters, respectively, for the plurality of load instructions and the controlling is based on values of the plurality of hit counters.

In some aspects, the techniques described herein relate to a processor unit including a cache system including a plurality of cache levels, a load-store unit configured to generate a load response from the cache system for processing by an execution unit, a data reuse cache communicatively coupled between the execution unit and the load-store unit, the data reuse cache configured to store data of the load response, and the execution unit configured to filter load instructions for access to the data reuse cache based on a respective likelihood that the load instructions, respectively, result in a hit or miss to the data reuse cache.

In some aspects, the techniques described herein relate to a processor unit, wherein the data reuse cache is physically located closer to the execution unit on an integrated circuit than the load-store unit or the cache system.

In some aspects, the techniques described herein relate to a processor unit, wherein the respective likelihood is based on values of hit counters maintained, respectively, for the load instructions, in which, values of the hit counters are indicative of a number of times, respectively, the load instructions from the data reuse cache are a hit.

In some aspects, the techniques described herein relate to a processor unit, wherein the values of the hit counters are indicative of the number of times, respectively, the load instructions from the data reuse cache are a hit over a window defining a threshold number of hits.

In some aspects, the techniques described herein relate to a processor unit, wherein the execution unit is configured to control access by: generating the respective likelihood that a respective load instruction, of the load instructions, does not result in a hit, and in response to the generating, restricting access to the data reuse cache and permitting access, directly, to the plurality of cache levels.

In some aspects, the techniques described herein relate to a processor unit including: a cache system including a cache level, an execution unit configured to access a data reuse cache in parallel with access to the cache level of the cache system through a load-store unit, the data reuse cache communicatively coupled between the execution unit and the load-store unit, and the load-store unit configured to: generate a load response from the cache system in response to a load instruction received from the execution unit, load data from the load response to the execution unit for processing, and store the data from the load response to the data reuse cache.

In some aspects, the techniques described herein relate to a processor unit, wherein the load instruction is included as part of a plurality of load instructions and the execution unit is configured to filter the plurality of load instructions to control access to the data reuse cache based on a respective likelihood of a hit or miss to the data reuse cache.

In some aspects, the techniques described herein relate to a processor unit, wherein the respective likelihood is based on values of hit counters maintained, respectively, for the plurality of load instructions.

In some aspects, the techniques described herein relate to a processor unit, wherein values of the hit counters are indicative of a number of times, respectively, the plurality of load instructions from the data reuse cache are a hit.

In some aspects, the techniques described herein relate to a processor unit, wherein the cache level is a level 1 data cache.

In some aspects, the techniques described herein relate to a processor unit, wherein the load instruction is included as part of a plurality of load instructions and the execution unit is configured to control access by: generating a respective likelihood that a respective load instruction of the plurality of load instructions does not result in a hit, and in response to the generating, restricting access to the data reuse cache and permitting access, directly, to the cache level.

FIG. 1 is a block diagram of a non-limiting example system 100 configured to employ data reuse cache techniques. The system 100 includes a device 102 having a processor unit 104, physical volatile memory 106 (e.g., random access memory), and persistent storage 108, e.g., a hard drive. The device 102 is configurable in a variety of ways. Examples of which include, by way of example and not limitation, computing devices, servers, mobile devices (e.g., wearables, mobile phones, tablets, laptops), processors (e.g., graphics processing units, central processing units, and accelerators), digital signal processors, disk array controllers, hard disk drive host adapters, memory cards, solid-state drives, wireless communications hardware connections, Ethernet hardware connections, switches, bridges, network interface controllers, and other apparatus configurations. It is to be appreciated that in various implementations, the device 102 is configured as any one or more of those devices listed just above and/or a variety of other devices without departing from the spirit or scope of the described techniques.

The processor unit 104 includes an execution unit 110, a load-store unit 112, and a cache system 114. The execution unit 110 is representative of functionality of the processor unit 104 implemented in hardware that performs operations, e.g., based on instructions received through execution of software. The execution unit 110 includes registers 116 that are configured to maintain data that is processed by the execution unit 110, e.g., for arithmetic and logic operations.

The load-store unit 112 is representative of functionality of the processor unit 104 to execute load and store instructions. Load instructions and corresponding operations involve loading data from the cache system 114, physical volatile memory 106, and/or persistent storage 108 to the registers 116 of the execution unit 110 for processing. Store instructions and corresponding operations include storing data from the registers 116 (e.g., after processing by the execution unit 110) back to the cache system 114, physical volatile memory 106, and/or persistent storage 108.

The load-store unit 112, for instance, is configured to support use of virtual memory by translating virtual memory addresses used by software to physical memory addresses. Virtual memory is a technique to manage use of shared physical memory. Virtual memory supports a variety of different functionality. Examples of this functionality include expansion of an amount of storage made available to applications beyond that which is actually available in the physical memory, offload memory management from applications and operating systems, use of a variety of different types of memory without the applications being made aware, support memory optimization, address memory fragmentation, and so forth as further described in relation to FIG. 4.

The cache system 114 includes a plurality of cache levels 118, examples of which are illustrated as a level 1 cache 120(1) through a level "N" cache 120(N). Configuration of the cache levels 118 is utilized to take advantage of a variety of locality factors. Spatial locality is used to improve operation in situation in which data is requested that is stored physically close to data that is a subject of a previous request. Temporal locality is used to address scenarios in which data that has already been requested will be requested again.

In cache operations, a "hit" occurs to a cache level when data that is subject of a load operation is available via the cache level, and a "miss" occurs when the desired data is not available via the cache level. When employing multiple cache levels, requests proceed through successive cache levels 118 until the data is located. The cache system 114 is configurable in a variety of ways (e.g., in hardware) to address a variety of processor unit 104 configurations, such as a central processing unit cache, graphics processing unit cache, parallel processor unit cache, digital signal processor cache, and so forth.

The processor unit 104 also includes a data reuse cache 122. The data reuse cache 122 is physically located on the processor unit 104 (e.g., using hardware circuitry on an integrated circuit) between the load-store unit 112 and the execution unit 110. The data reuse cache 122 is configured to leverage scenarios in which data loaded by a load instruction of the load-store unit 112 is accessed again in succession, e.g., by itself or other instructions. Keeping this data close to the execution unit 110 for faster reuse reduces a cost incurred in loading the data from the cache levels 118, e.g., the level 1 cache 120(1). In one example, the data reuse cache 122 is accessible in parallel with the cache system 114 through the load-store unit 112, e.g., with a level 1 data cache as further described in relation to FIG. 2.

The data reuse cache 122 is configurable to be "filled" based on load responses generated by the load-store unit 112. In one example, the data reuse cache 122 is configured, solely, for data reuse. Any load response from the load-store unit 112 is usable to fill the data reuse cache 122, e.g., from cache levels 118 of the cache system 114, physical volatile memory 106, persistent storage 108, and so forth. In an implementation, complex memory data communication is delegated to the load-store unit 112, thereby increasing operational efficiency as further described in relation to FIG. 4 below. In this way, a likelihood that data stored in the data reuse cache 122 is relevant to subsequent load instructions is increased, thereby reducing a probability of a cache miss.

In another example of techniques usable to solve these problems, a filter module 124 and filter 126 are employed by the execution unit 110 to manage load operations. The filter module 124 employs the filter 126 to control access by the load operations to the data reuse cache 122. Load operations that have a lower than a threshold amount of likelihood of resulting in a hit to the data reuse cache 122, for instance, are restricted from accessing the data reuse cache 122. Instead, these load operations are targeted directly to the cache levels 118 through the load-store unit 112.

As a result, a performance penalty as would otherwise be encountered by a cache miss to the data reuse cache 122 is avoided, thereby supporting implementation as a smaller cache having increased access efficiency, i.e., speed. Other examples include use of virtual memory addresses by the data reuse cache 122, use of a self-broadcast to wake-up dependent operations rather than employ a conventional broadcast, and leveraging logic in the load-store unit 112 to verify data correctness such as ordering violation and data integrity. Further discussion of these and other examples is included in the following discussion and shown in corresponding figures.

Figure 2:
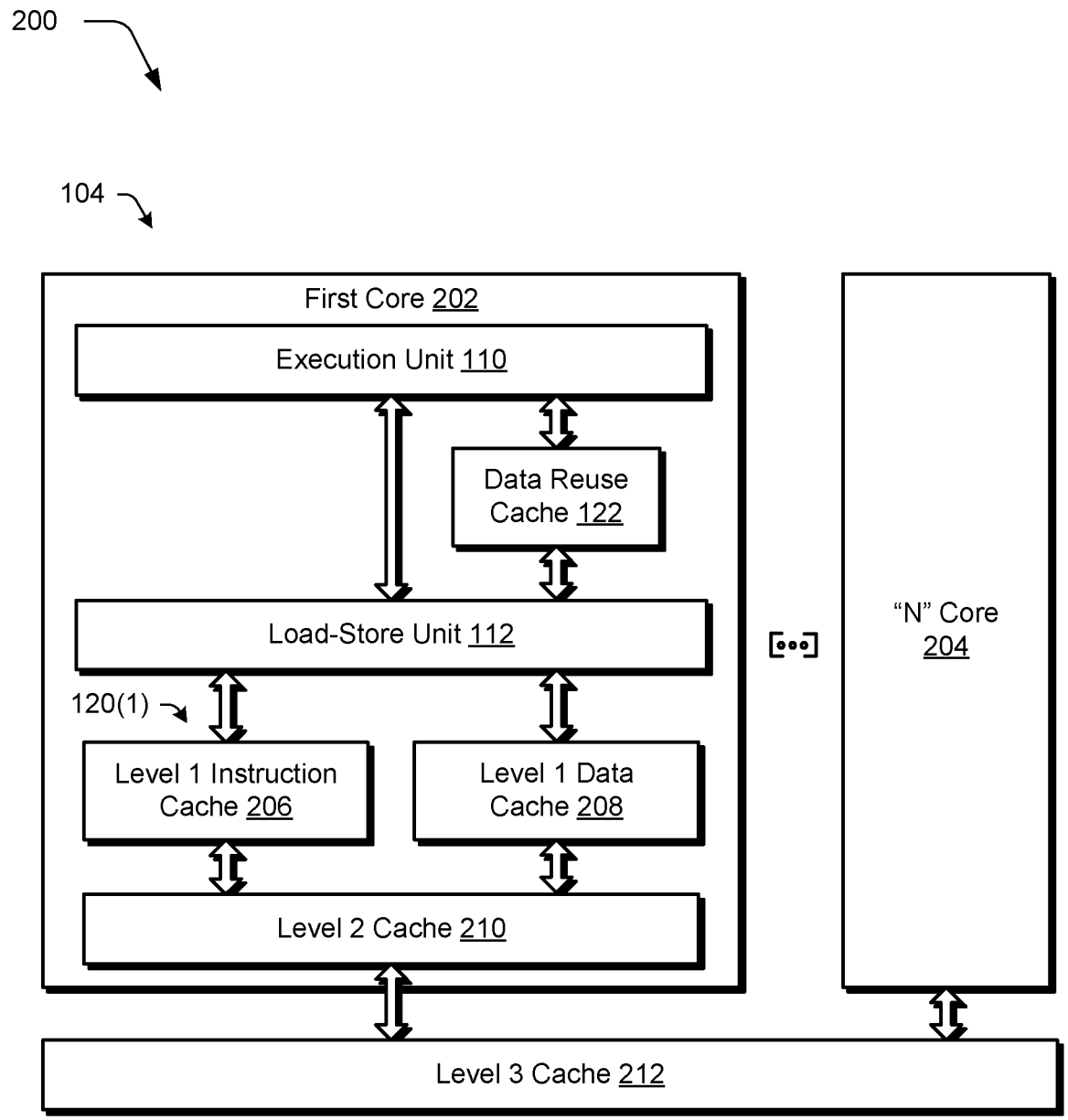
FIG. 2 is a block diagram of a non-limiting example system configured to employ data reuse cache techniques in a multi-core processor architecture in which a level 1 cache of FIG. 1 is implemented as a split cache.

FIG. 2 is a block diagram of a non-limiting example system 200 configured to employ data reuse cache techniques in a multi-core processor architecture in which a level 1 cache 120(1) of FIG. 1 is implemented as a split cache. The processor unit 104 is configured as a single integrated circuit having a plurality of cores, illustrated as a first core 202 through "N" core 204. The first core 202 is illustrated in greater detail and includes an execution unit 110 and load-store unit 112 as previously described.

The cache system 114 is illustrated as having a level 1 cache 120(1) and a level 2 cache 210 included as part of the first core 202. A level 3 cache 212 is shared by the first core 202 and the "N" core 204. Other examples are also contemplated, e.g., in which the level 2 cache 210 is shared by the first core 202 and "N" core 204, inclusion of a level 4 cache, and so forth.

The level 1 cache 120(1) is implemented using a split cache architecture that is maintained as two separate level 1 caches, e.g., a level 1 instruction cache 206 and a level 1 data cache 208. This architecture supports numerous technical features, including simultaneous operation in which data is read from the level 1 data cache 208 in parallel while loading instructions from the level 1 instruction cache 206.

As previously described, the data reuse cache 122 is physically located between the execution unit 110 and the load-store unit 112 and as such is physically closer to the execution unit 110 than the cache levels of the cache system 114. The data reuse cache 122 is accessible in parallel with the level 1 data cache 208 in this example through the load-store unit 112. The data reuse cache 122 is "filled" using data communicated in a load response, e.g., in response to a "hit" to any of the cache levels or other memory as further described in relation to the following discussion and corresponding figure. A variety of other examples are also contemplated.

Figure 3:
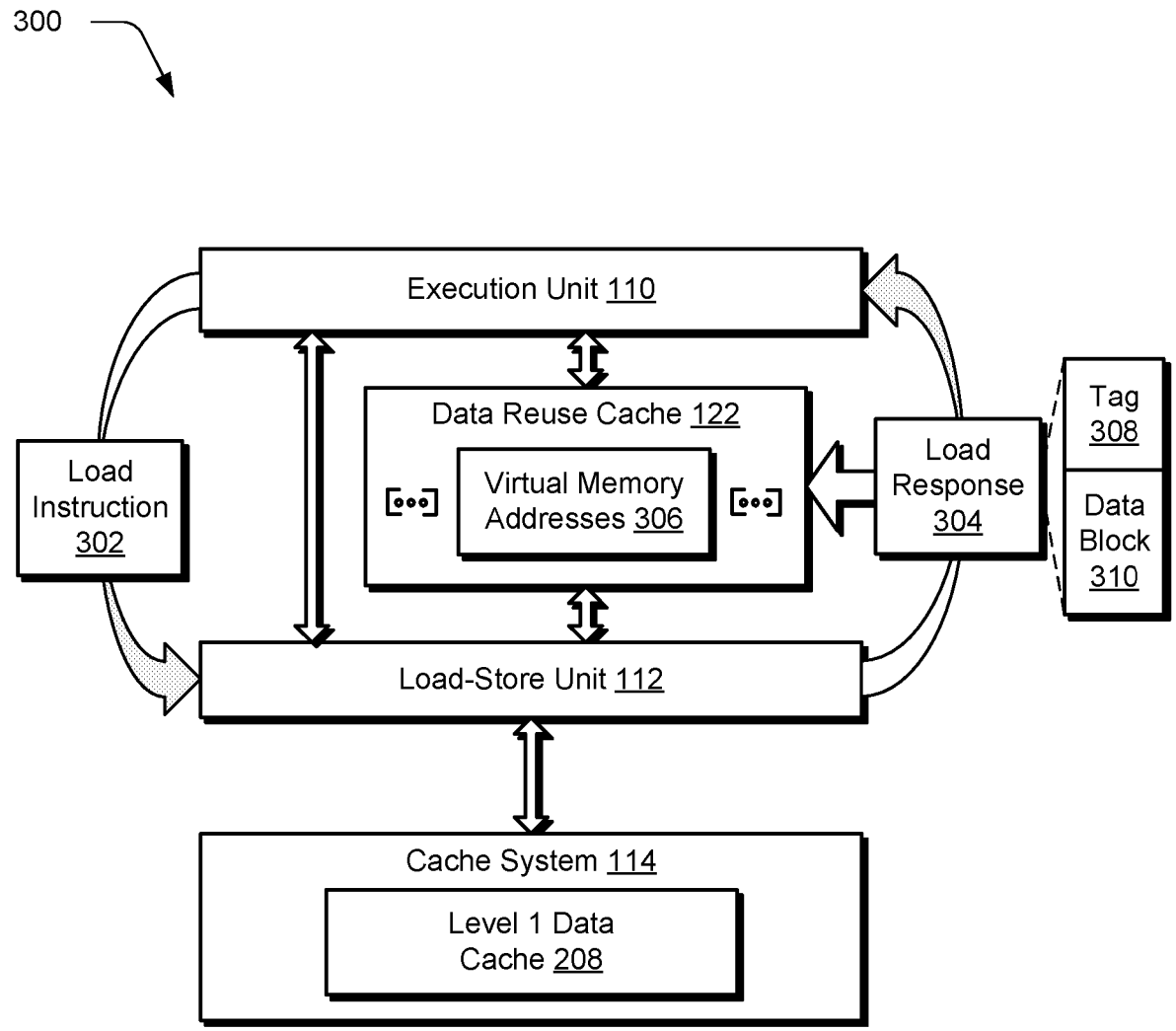
FIG. 3 is a block diagram of a non-limiting example system configured to employ data reuse cache techniques to fill a data reuse cache using load responses as virtual memory addresses.

FIG. 3 is a block diagram of a non-limiting example system 300 configured to employ data reuse cache techniques to fill a data reuse cache 122 using load responses from the load-store unit as virtual memory addresses. As illustrated in this example, a load instruction 302 is received by the load-store unit 112 and used to access a cache system 114, e.g., a level 1 data cache 208. A load response 304 from the load-store unit 112 is then returned (e.g., for loading to registers 116 of the execution unit 110) which is also leveraged to fill the data reuse cache 122. In this way, existing load response buses from the load-store unit 112 are usable to also fill the data reuse cache 122, thereby conserving power and without employing additional hardware circuitry. A cache line size is configured, in one example, to match a width of these load response buses.

In an implementation, data is accessible via the data reuse cache 122 in a fewer number of cycles than that used to access data via respective cache levels 118 of the cache system 114. Loading data from the level 1 data cache 208 to the execution unit 110 in response to the load instruction 302 is typically performed in four cycles. However, loading the data from the data reuse cache 122 for processing by the execution unit 110 in response to a subsequent load instruction is performable in two cycles.

The data reuse cache 122 is configured to utilize virtual memory addresses 306 to locate corresponding data within the data reuse cache 122. Physical memory addresses of a load instruction are not available in some instances until a translation lookaside buffer (TLB) translation is performed by the load-store unit 112. Accordingly, virtual memory addresses 306 are utilized using respective tags 308 and data blocks 310, thereby improving efficiency.

In some instances, aliasing is encountered in which multiple virtual memory addresses point to a same physical address location. In these instances, a load operation might miss in the data reuse cache 122, although in actuality the data is available under a different virtual memory address. These situations instead are served by the load-store unit 112, e.g., as a reuse cache miss and are serviced in the level 1 cache 120(1) which uses physical tags. Further, in an implementation the data reuse cache 122 supports load operations that align with a cache line boundary. Load operations that span more than one cache line are treatable as a miss and instead involve routing to the load-store unit 112 for servicing by the load-store unit, e.g., to access other caches, physical memory, and so forth.

Figure 4:
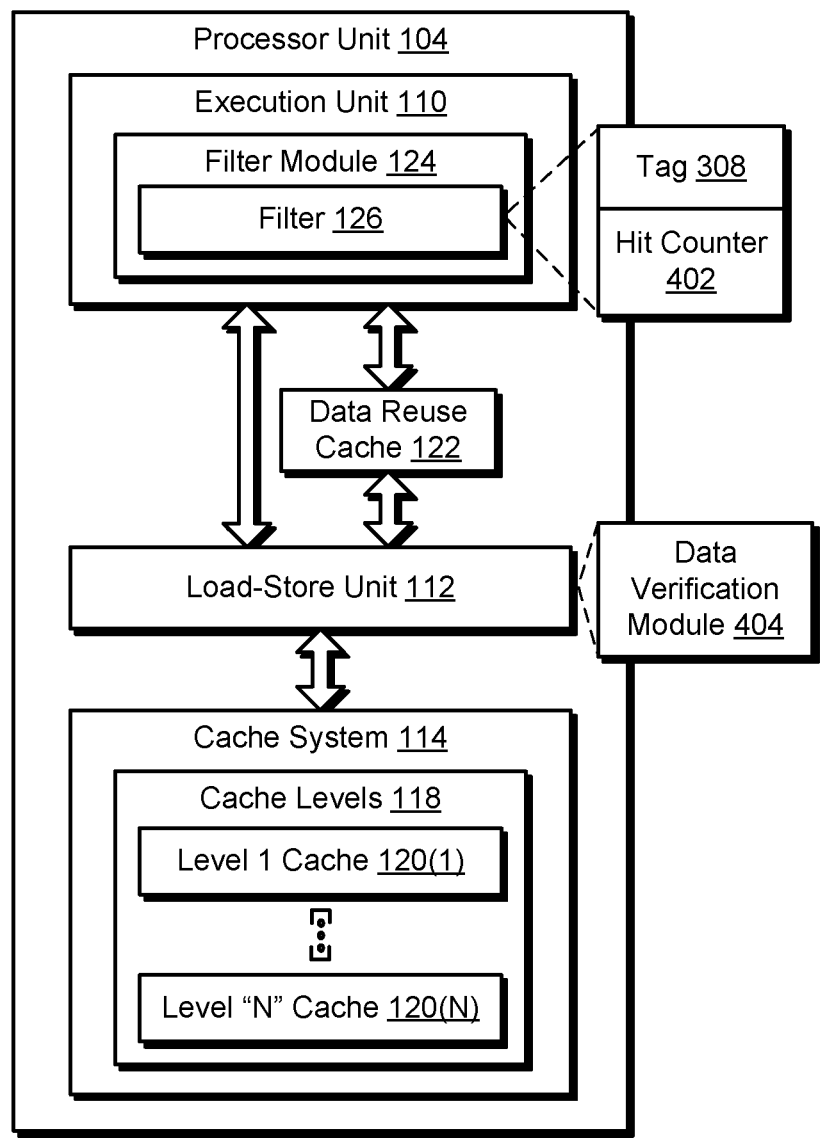
FIG. 4 is a block diagram of a non-limiting example system configured to employ a filter module and filter as part of data reuse cache techniques to control access to the data reuse cache.

FIG. 4 is a block diagram of a non-limiting example system 400 configured to employ a filter module 124 and filter 126 as part of data reuse cache techniques to control access to the data reuse cache 122. The filter module 124 is implemented in this example as part of the execution unit 110, e.g., by a dispatch unit. The filter module 124 is configured to remove and restrict (i.e., "filter out") access of load instructions 302 to the data reuse cache 122 based on a likelihood of resulting in a miss. Therefore, load instructions 302 that are filtered out bypass access to the filter module 124 and directly access the cache levels 118 without incurring a performance penalty.

The filter module 124, for instance, is configured to check tags 308 for a hit/miss indication to train the filter 126. The filter 126 is configurable as a set-associative structure indexed by a program counter (i.e., an instruction pointer), and a hashed version of the program counter acts as a tag 308. An entry, for instance, is allocated for a respective program counter once a first hit to the data reuse cache 122 is detected. Each entry in the filter 126 tracks values (e.g., a number of hits) using a hit counter 402 over a window, e.g., a threshold number of lookups for the program counter. In an example, both counters bit-shift right on saturation.

The filter module 124 then determines whether to permit or restrict access based on the filter 126. A program counter with a hit rate greater than a threshold amount (e.g., fifty percent) is permitted access by the filter module 124 to the data reuse cache 122. In a real-world scenario, this results in more than a twenty-fold reduction in misses to the data reuse cache 122, thereby permitting use of the data reuse cache 122.

Access to the data reuse cache 122 is treatable as a fixed cycle execution unit 110 operation. A picked load operation that has passed a dispatch time in the data reuse cache 122 (e.g., operations performed when an instruction or microinstruction {e.g., UOP} is dispatched in a dispatch unit) causes the address generation unit to "self-broadcast" to wake-up dependent operations rather than waiting for the load-store unit 112. To avoid adding an additional broadcast port for each address generation unit (which is an arithmetic logic unit used to compute an address of a load or store microinstruction), the execution unit 110 opportunistically uses the broadcast ports for the load-store unit 112 to broadcast data reuse cache 122 data responses. In the event a conflict occurs between a level 1 cache 120(1) data response and a data reuse cache 122 data response attempt to broadcast in a same cycle, the level 1 cache 120(1) is given priority and the access attempt to data reuse cache 122 is dropped and is instead treated as a data reuse cache miss.

When an access attempt to the data reuse cache 122 is restricted (i.e., filtered out), the access attempt (i.e., the corresponding load instruction) becomes eligible for level 1 cache 120(1) access by the load-store unit 112. Because the load-store unit 112 is tasked with waiting until it receives an indication of a hit or miss to the data reuse cache 122, additional latency is possible to be incurred for these load operations. Accordingly, in some instances the load-store unit 112 is configured not to read data reuse cache 122 load accesses from the level 1 cache 120(1) for power savings.

The load-store unit 112 includes a data verification module 404 that is representative of functionality to manage techniques to promote data correctness of load responses. The data verification module 404, for instance, is used to verify ordering violations and data integrity for hits from the data reuse cache 122. Further, the data verification module 404 is configured to trigger a resynchronization operation when warranted, e.g., the data that is subject of a load instruction in the data reuse cache 122 is detected as stale.

The load-store unit 112 is also configurable to perform the following functions in support of the data reuse cache 122. In order to fill the data reuse cache 122, the load-store unit 112 sends loads data size and waits on a load response from the level 1 cache 120(1) to the execution unit 110 as previously described. In a further example, a resynchronization operation is triggered for a store interlocked load operation that also hits in the data reuse cache 122. In further examples, an invalidating probe is sent to the data reuse cache 122 when a store operation commits into the level 1 cache 120(1) (e.g., the level 1 data cache 208), an invalidating probe is sent to the data reuse cache 122 on level 1 data cache 208 evictions, and so forth.

In one example as previously described, the data reuse cache 122 utilizes virtual memory addresses 306 as opposed to physical addresses. Because of this, however, a L1 cache line is incapable of being invalidated from the data reuse cache 122 using its physical address. To address this in a first instance, physical addresses, and not virtual addresses, are maintained in the data reuse cache 122. In a second instance, each data reuse cache line in the data reuse cache 122 is tagged with its corresponding L1 line's way and also includes a L1 index (e.g., using additional bits) to implement similar functionality. This is due to the increased data storage size in this example of the L1 cache in comparison with the data reuse cache 122, and therefore data reuse cache index bits are a subset of L1 cache index bits. Non-overlapping portions of the bits are saved. Invalidating probes from a store operation (when committing into a L1 cache or from an evicted L1 cache line) contain "L1 way" to correctly perform invalidation operations in the data reuse cache 122. In yet another example, a resynchronization operation is triggered if a load operation that "hit" in the data reuse cache 122 misses in the level 1 cache or if "L1 way" information in the data use cache 122 does not match an actual way on a level 1 hit.

Forwarding of data from inflight stores to an inflight load involves complex timing of structures and priority encoding. In an implementation, the load-store unit 112 is tasked with handling load operations that might interlock (full or partial address match) on inflight older stores to the load-store unit, instead of adding complexity to execution unit. This is performable by triggering a resynchronization operation (e.g., full pipeline flush/recovery and fetch restart) each time an interlock is detected for a data reuse cache 122 load operation.

Resynchronization operations are costly for performance and are capable of overwhelming device operation if not controlled. To reduce the number of resynchronization operations, a variety of mitigation solutions are employable by the processor unit 104. In one example, cache lines of the data reuse cache 122 are invalidated once a store operation has completed address computation. This causes younger load operations that might interlock on the store to miss in the data reuse cache 122 and instead are serviced by the load-store unit 112.

In another example, load operations are disqualified from reading the data reuse cache 122 that are predicted to forward from an inflight store or predicted to trigger a resynchronization operation. This further reduces a chance of a resynchronization operation. Memory dependence prediction, memory renaming, and resynchronization operation predictions are usable at execution time.

A store operation invalidating a cache line of the data reuse cache 122 using virtual memory addresses, in some instances, leaves aliased copies and causes a stale copy to persist. To purge the data reuse cache 122 of stale copies, the data reuse cache 122 is probed-out when the store operation completes, i.e., data is written to the level 1 data cache 208. A variety of other examples are also contemplated.

Figure 5:
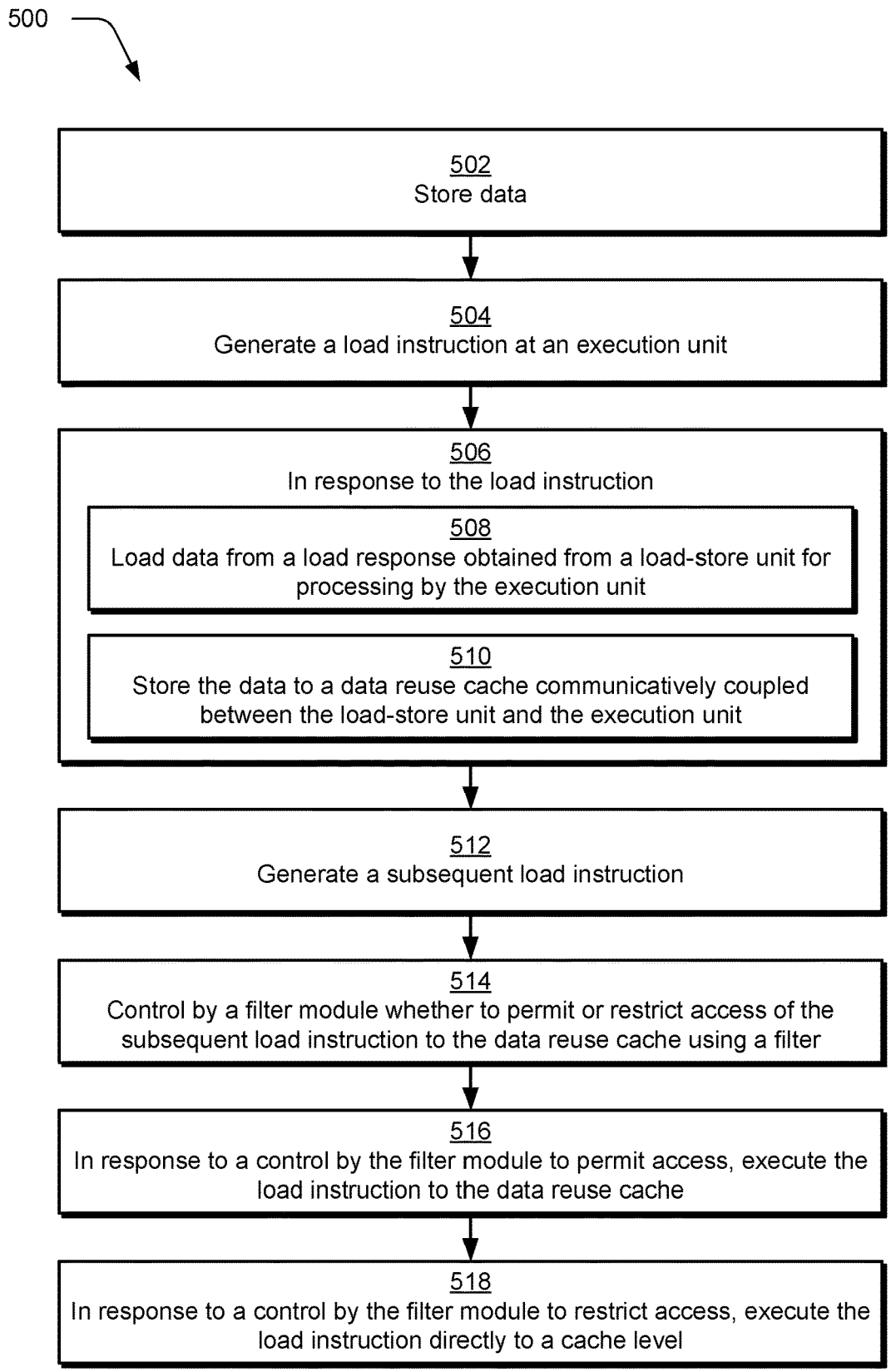
FIG. 5 is a flow diagram depicting a procedure in a non-limiting example implementation of operation of a data reuse cache.

FIG. 5 depicts a procedure 500 in an example implementation of operation of a data reuse cache 122. Data is stored (block 502). By way of example, the data is stored in a level 1 cache 120(1) (e.g., a level 1 data cache 208) by a load-store unit 112 for processing by an execution unit 110. Other examples include additional levels of the cache system 114, physical volatile memory 106, persistent storage 108, and so on.

A load instruction is generated by an execution unit (block 504). By way of example, the load instruction 302 is generated and communicated to a load-store unit 112.

In response to the load instruction (block 506), data is loaded from a load response obtained from a load-store unit for processing by the execution unit (block 508). The data is also stored to a data reuse cache communicatively coupled between the load-store unit and the execution unit (block 510). By way of example, the data is loaded from the level 1 cache 120(1) (e.g., a level 1 data cache 208) in response to the load instruction to both the execution unit 110 for processing as well as stored in the data reuse cache 122.

A subsequent load instruction is generated (block 512). By way of example, the subsequent load instruction is generated by the execution unit 110. A filter module controls whether to permit or restrict access of the subsequent load instruction to the data reuse cache using a filter (block 514). By way of example, the execution unit 110 includes a filter module 124 and a filter 126. The filter 126 is configured to predict a likelihood that respective load instructions will result in a hit or miss to the data reuse cache 122, e.g., using hit counters and a window with respect to a threshold hit rate.

In response to a control by the filter module to permit access, the load instruction is executed to the data reuse cache (block 516). By way of example, the execution unit 110 queries tags 308 of the data reuse cache 122 to determine whether the data is available via the cache. If so, the data is returned for processing by the execution unit 110, e.g., in two execution cycles of the processor unit 104. If not, the queries proceed through cache levels 118 of the cache system 114.

In response to a control by the filter module to restrict access, the load instruction is executed directly to a cache level (block 518). By way of example, a request is not made to the data reuse cache 122. Rather, a level 1 cache 120(1) (e.g., a level 1 data cache 208) is examined to determine data availability by the load-store unit 112. If the data is available, the data is returned for processing by the execution unit 110. If not, the queries proceed through cache levels 118 of the cache system 114, to physical volatile memory 106, to persistent storage 108, and so forth.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the device 102) are implemented in any of a variety of different manners such as hardware circuitry, software or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
generating a load instruction at an execution unit;
in response to the load instruction:
loading data from a load response obtained from a load-store unit for processing by the execution unit; and
storing the data from the load response to a data reuse cache communicatively coupled between the load-store unit and the execution unit;
generating a subsequent load instruction for the data at the execution unit; and
loading the data from the data reuse cache for processing by the execution unit in response to the subsequent load instruction.

2. The method of claim 1, wherein the loading the data includes loading the data from a level of a cache system by the load-store unit.

3. The method of claim 2, wherein the loading the data from the load response is performed in four cycles from the level of the cache system and the loading the data from the data reuse cache is performed in two cycles.

4. The method of claim 1, further comprising generating a subsequent load instruction and routing the subsequent load instruction for servicing by the load-store unit based on detecting the subsequent load instruction spans more than one cache line of the data reuse cache.

5. The method of claim 1, further comprising generating a subsequent load instruction and triggering a resynchronization operation based on detecting data that is a subject of the subsequent load instruction is stale.

6. The method of claim 1, further comprising self-broadcasting a data reuse cache response that includes the data, the self-broadcasting using a broadcast port of the load-store unit.

7. The method of claim 1, further comprising controlling whether to permit or restrict access, by the subsequent load instruction, to the data reuse cache using a filter.

8. The method of claim 7, wherein the filter indicates a likelihood that the subsequent load instruction is a hit or miss to the data reuse cache.

9. The method of claim 7, wherein the subsequent load instruction is included in a plurality of load instructions and the filter maintains a plurality of hit counters, respectively, for the plurality of load instructions and the controlling is based on values of the plurality of hit counters.

10. A processor unit comprising:
a cache system including a plurality of cache levels;
a load-store unit configured to generate a load response from the cache system for processing by an execution unit;
a data reuse cache communicatively coupled between the execution unit and the load-store unit, the data reuse cache configured to store data of the load response; and
the execution unit configured to filter load instructions for access to the data reuse cache based on a respective likelihood that the load instructions, respectively, result in a hit or miss to the data reuse cache.

11. The processor unit of claim 10, wherein the data reuse cache is physically located closer to the execution unit on an integrated circuit than the load-store unit or the cache system.

12. The processor unit of claim 10, wherein the respective likelihood is based on values of hit counters maintained, respectively, for the load instructions, in which, values of the hit counters are indicative of a number of times, respectively, the load instructions from the data reuse cache are a hit.

13. The processor unit of claim 12, wherein the values of the hit counters are indicative of the number of times, respectively, the load instructions from the data reuse cache are a hit over a window defining a threshold number of hits.

14. The processor unit of claim 10, wherein the execution unit is configured to control access by:
generating the respective likelihood that a respective load instruction, of the load instructions, does not result in a hit; and
in response to the generating, restricting access to the data reuse cache and permitting access, directly, to the plurality of cache levels.

15. A processor unit comprising:
a cache system including a cache level;
an execution unit configured to access a data reuse cache in parallel with access to the cache level of the cache system through a load-store unit;
the data reuse cache communicatively coupled between the execution unit and the load-store unit; and
the load-store unit configured to:
generate a load response from the cache system in response to a load instruction received from the execution unit;
load data from the load response to the execution unit for processing; and
store the data from the load response to the data reuse cache.

16. The processor unit of claim 15, wherein the load instruction is included as part of a plurality of load instructions and the execution unit is configured to filter the plurality of load instructions to control access to the data reuse cache based on a respective likelihood of a hit or miss to the data reuse cache.

17. The processor unit of claim 16, wherein the respective likelihood is based on values of hit counters maintained, respectively, for the plurality of load instructions.

18. The processor unit of claim 17, wherein values of the hit counters are indicative of a number of times, respectively, the plurality of load instructions from the data reuse cache are a hit.

19. The processor unit of claim 15, wherein the cache level is a level 1 data cache.

20. The processor unit of claim 15, wherein the load instruction is included as part of a plurality of load instructions and the execution unit is configured to control access by:
generating a respective likelihood that a respective load instruction of the plurality of load instructions does not result in a hit; and
in response to the generating, restricting access to the data reuse cache and permitting access, directly, to the cache level.

* * * * *